US012644690B2

(12) United States Patent
Xu et al.

(10) Patent No.: US 12,644,690 B2
(45) Date of Patent: Jun. 2, 2026

(54) COAXIAL WAVEGUIDE-BASED GEOTECHNICAL MULTI-POINT DEFORMATION SENSOR AND METHOD OF ADJUSTABLE GAUGE-LENGTH MEASUREMENT

(71) Applicant: Chengdu University of Technology, Chengdu (CN)

(72) Inventors: Qiang Xu, Chengdu (CN); Tong Jiao, Chengdu (CN); Xing Zhu, Chengdu (CN); Minggao Tang, Chengdu (CN); Xu Chen, Chengdu (CN); Chuhong Pu, Chengdu (CN); Xianling Tao, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 222 days.

(21) Appl. No.: 18/776,409

(22) Filed: Jul. 18, 2024

(65) Prior Publication Data

US 2024/0369343 A1 Nov. 7, 2024

Related U.S. Application Data

(63) Continuation of application No. PCT/CN2024/083359, filed on Mar. 22, 2024.

(30) Foreign Application Priority Data

Mar. 31, 2023 (CN) .......................... 202310335665.7

(51) Int. Cl.
*G01B 7/24* (2006.01)
*H01P 3/06* (2006.01)

(52) U.S. Cl.
CPC . *G01B 7/24* (2013.01); *H01P 3/06* (2013.01)

(58) Field of Classification Search
CPC .. G01B 7/24; G01B 11/16; G01B 7/16; H01P 3/06; Y02A 90/30; G01N 27/02; G01N 27/22
See application file for complete search history.

(56) References Cited

U.S. PATENT DOCUMENTS 6,696,974 B1 * 2/2004 Mathis ................. G01M 11/086
340/870.31
2024/0393492 A1 * 11/2024 Boinet ..................... G01V 3/12

FOREIGN PATENT DOCUMENTS

CN 101561244 A 10/2009
CN 208235488 U * 12/2018
(Continued)

OTHER PUBLICATIONS

Chen, Yun et al.; "Application of TDR to Rock and Soil Deformation Measurements," Central South Highway Engineering, vol. 2, No. 4; Dec. 2004, China Academic Journal Electronic Publishing House, www.ckni. net; 6 pgs.
(Continued)

*Primary Examiner* — Son T Le
(74) *Attorney, Agent, or Firm* — Central California IP Group, P.C.; Andrew D. Fortney

(57) ABSTRACT

A coaxial waveguide-based geotechnical multi-point deformation sensor and an adjustable gauge-length measurement method are provided. The coaxial waveguide-based geotechnical multi-point deformation sensor includes an outer conductor, open at opposite ends and hollow inside; magnetic metal support frames, inside the outer conductor, sequentially spaced along an axial direction of the outer conductor and each having a through-hole; an inner conductor inside the outer conductor and passing through each through-hole; and annular magnets, surrounding the outer conductor and configured to move along it, driving the nearest magnetic metal support frame to follow its move-
(Continued)

ment. Each magnetic metal support frame acts as a reflection point. By reconstructing the interference spectra of any two reflection points, a gauge-length can exist between any two of the magnetic metal support frames. By collecting the changes in the interference spectrum signals of different gauge-lengths, deformation of geotechnical layers corresponding to the gauge-length(s) can be calculated, thus allowing the deformation of any geotechnical layer to be determined.

17 Claims, 4 Drawing Sheets

(56) References Cited

FOREIGN PATENT DOCUMENTS

| CN | 110375631 | A | * | 10/2019 | ............... | G01B 7/02 |
| CN | 114111619 | A | | 3/2022 | | |
| CN | 115265396 | A | | 11/2022 | | |
| CN | 115597518 | A | | 1/2023 | | |
| CN | 118758155 | A | * | 10/2024 | ............. | G01N 27/00 |
| KR | 100879876 | B1 | | 1/2009 | | |

OTHER PUBLICATIONS

International Search Report dated Jun. 4, 2024; International Application No. PCT/CN2024/083359; International Filing Date Mar. 22, 2024; 4 pages; China National Intellectual Property Administration (ISA/CN), Beijing, China.

Written Opinion dated Jun. 4, 2024; International Application No. PCT/CN2024/083359; International Filing Date Mar. 22, 2024; 4 pages; China National Intellectual Property Administration (ISA/CN), Beijing, China.

* cited by examiner

COAXIAL WAVEGUIDE-BASED GEOTECHNICAL MULTI-POINT DEFORMATION SENSOR AND METHOD OF ADJUSTABLE GAUGE-LENGTH MEASUREMENT

CROSS-REFERENCE TO RELATED APPLICATIONS

This application is a continuation of International Pat. Appl. No. PCT/CN2024/0833359, filed on Mar. 22, 2024, which claims the benefit of Chinese Pat. Appl. No. 2023103356657, filed on Mar. 31, 2023, both of which are incorporated herein by reference as if fully set forth herein.

FIELD OF THE INVENTION

The present invention relates to the field of geotechnical deformation monitoring technology, and more particularly to a coaxial waveguide-based geotechnical multi-point deformation sensor and an adjustable gauge-length measurement method using the same.

BACKGROUND OF THE INVENTION

The deformation information at different depths within a geotechnical body is an important indicator for analyzing the mechanisms and evolution laws of various geotechnical engineering disasters (such as landslides, mine overburden deformation, subgrade settlement or heave, deformation of rock surrounding a tunnel, etc.), as well as for evaluating the stability of the geotechnical body.

Traditional methods for measuring geotechnical deformation at different depths involve placing settlement observation markers or single-point displacement transducers in boreholes at various depths. These techniques are complex to install and require manual readings, making it difficult to achieve long-term real-time monitoring. Currently, there is still a need for devices that are easy to install and capable of long-term automated monitoring.

In recent years, some new devices for measuring deformation at different depths within geotechnical bodies have emerged. For example, Chinese Patent Application No. CN200910069372.9 discloses a magnetic ring-based layered settlement testing system that uses the principle of electromagnetic induction. This system detects the position information of magnetic rings buried in the geotechnical body by moving a magnetic measuring head with a scaled cable, thereby calculating geotechnical deformations at different depths. However, this method requires manual readings, the operation process is complex, and the measurement accuracy is low due to the sensing range between the magnetic measuring head and the magnetic ring. Chinese Patent Application No. CN201710787646.2 discloses a geotechnical layered settlement measurement method and system based on the Hall effect. This system employs a Hall integrated sensor array to detect the magnetic induction intensity of magnetic rings buried in the geotechnical body, thereby measuring their positions and obtaining deformation data at different depths. While this method can achieve high-precision online continuous measurement, it is susceptible to electromagnetic interference. Chinese Patent Application No. CN201510215836.8 discloses a hydraulic layered settlement instrument. It calculates the settlement at different soil depths by measuring the hydraulic difference between a reference pipe and a measuring pipe using a hydraulic sensor. However, this device is complex to install and has low measurement stability. Chinese Patent Application No. CN201310399092.0 discloses a geotechnical layered deformation measurement method based on optical fiber sensing technique. This method embeds a distributed optical fiber sensor into a borehole to measure the strain distribution along its depth, integrating the strain to obtain deformation information of soil layers at different depths within the geotechnical body. However, this method has several drawbacks, including the susceptibility of optical fibers to breakage, difficult installation, sensitivity to temperature effects, large cumulative error in converting strain to displacement, and expensive demodulation equipment.

Although existing technologies can achieve deformation measurement at different depths within a geotechnical body, they all have shortcomings. Importantly, the measurement gauge lengths of these technologies need to be preset and remain unchanged. The positions and thicknesses of various geotechnical layers within the geotechnical body are difficult to predict, and the thicknesses may vary (e.g., mudstone layers swell and deform when encountering water). In such cases, it is challenging for the measurement gauge length to match the positions and thicknesses of different geotechnical layers, making it impossible to precisely characterize the deformation evolution process of a specific layer.

Therefore, it is still necessary to explore a technical solution to address or at least mitigate the above-mentioned shortcomings of existing technologies.

SUMMARY

The purpose of the present invention is to provide a coaxial waveguide-based geotechnical multi-point deformation sensor to address at least one of the afore-mentioned technical issues.

The present invention provides the following solution:

According to one aspect of the present invention, a coaxial waveguide-based geotechnical multi-point deformation sensor is provided, which comprises:

an outer conductor that is open at opposite ends and hollow inside;

magnetic metal support frames inside said outer conductor and sequentially spaced along an axial direction of said outer conductor, wherein each of said magnetic metal support frames includes a through-hole;

an inner conductor inside said outer conductor and extending from one of the opposite ends of said outer conductor to the other of the opposite ends of said outer conductor, wherein said inner conductor passes through the through-hole of each of said magnetic metal support frames and is optionally in contact directly or indirectly with an inner surface of each of said magnetic metal support frames;

annular magnets, wherein each of said annular magnets surrounds said outer conductor and is configured to move along said outer conductor to drive a nearest one of said magnetic metal support frame;

wherein said inner conductor has a first central axis, said outer conductor has a second central axis coincident with the first central axis, and each of said through-holes has a third central axis coincident with the first and second central axes.

In some embodiments, the nearest one of the magnetic metal support frames follows movement of a corresponding one of the annular magnets when the corresponding one of the annular magnets moves. In other or further embodiments, the present sensor comprises at least three magnetic metal support frames and at least three corresponding annular magnets.

Optionally, the coaxial waveguide-based geotechnical multi-point deformation sensor further comprises a first radio-frequency connector at one of the opposite ends of said outer conductor, and said inner conductor has a first end that contacts said first radio-frequency connector. In some embodiments, the first radio-frequency connector is a first radio-frequency coaxial connector.

Optionally, the coaxial waveguide-based geotechnical multi-point deformation sensor further comprises a second radio-frequency connector at the other one of the opposite ends of said outer conductor, and said inner conductor has a second end that contacts the second radio-frequency connector; and a radio-frequency terminal load connected to said second radio-frequency connector. In some embodiments, the second radio-frequency connector is a second radio-frequency coaxial connector.

Optionally, the coaxial waveguide-based geotechnical multi-point deformation sensor further comprises a signal demodulation and analysis device and a signal transmission line connecting said signal demodulation and analysis device to said first radio-frequency connector.

Optionally, each said annular magnet includes an inner wall with one or more grooves or depressions therein. The outer conductor may have an outer surface with at least one slide rail or tab in contact with a corresponding one of the grooves or depressions. In some embodiments, each of the slide rails or tabs is convex. In other or further embodiments, each of the slide rails or tabs extends radially from the outer conductor. In other or even further embodiments, each of the slide rails or tabs (i) is in a 1:1 relationship with a corresponding one of the grooves or depressions and/or (ii) mates with the corresponding one of the grooves or depressions.

Optionally, said outer conductor includes an insulator therein. For example, the outer conductor may contain or be filled with the insulator.

Optionally, the center of each of the annular magnets has a center that coincides with a center of a corresponding one of said magnetic metal support frames (e.g., the magnetic metal support frame that is driven by the corresponding annular magnet).

Optionally, said outer conductor and said inner conductor comprise a same or different non-magnetic metal. For example, the outer conductor may comprise a first non-magnetic metal, and the inner conductor may comprise a second non-magnetic metal different from the first non-magnetic metal.

Additionally, the present invention provides a method of adjustable gauge-length measurement using the coaxial waveguide multipoint deformation sensor, the method comprising:

Continuously acquiring interference spectra between two of said magnetic metal support frames during a preset time period, the two magnetic metal support frames having locations corresponding to geotechnical layers; and Obtaining information relating to deformation of the geotechnical layers based on the acquired interference spectra.

The coaxial waveguide-based geotechnical multi-point deformation sensor includes multiple magnetic metal support frames, inside and spaced axially along the outer conductor. Each magnetic metal support frame may act as a reflection point. By reconstructing the interference spectra of any two reflection points, a sensing gauge-length can exist (or be created) between any two magnetic metal support frames. By collecting the changes in the interference spectrum signals of different sensing gauge-lengths, the deformation of the geotechnical layer corresponding to the magnetic metal support frame(s) (e.g., at the location of the sensing gauge-length) can be calculated, thus allowing the deformation of a geotechnical layer to be obtained as needed, without requiring separate sensors for each geotechnical layer. Additionally, by adjusting the positions of the magnetic metal support frames, it is possible to monitor the deformation of geotechnical layers at different depths.

The invention has the advantages that by embedding just one coaxial waveguide-based geotechnical multi-point deformation sensor within the geotechnical body, real-time monitoring of deformation(s) in different geotechnical layers can be achieved. Additionally, by reconstructing the interference spectra of any two reflection points, the measurement gauge-length of the sensor can be continuously adjusted according to the evolution of the geotechnical layer deformation, ensuring that deformation measurement is always performed with the most suitable gauge-length, thereby enabling precise measurement of the deformation(s) of the geotechnical layers.

Figure 1:
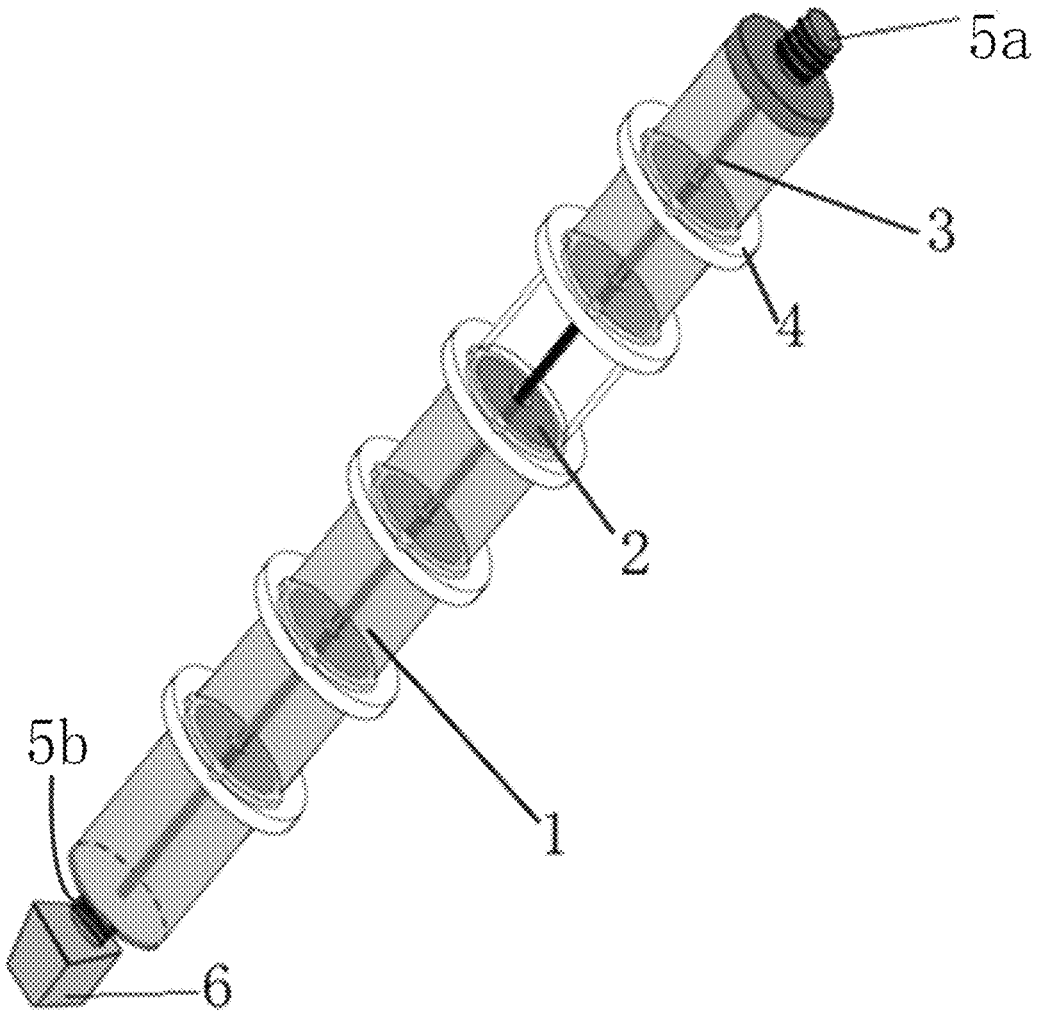
FIG. 1 is a diagram showing an exemplary coaxial waveguide-based geotechnical multi-point deformation sensor construction.

In the drawings, the following identification numbers indicate the corresponding structures:

1. Outer conductor; 2. Magnetic metal support frame; 3. Inner conductor; 4. Annular magnet; 5*a*. First radio-frequency connector; 5*b*. Second radio-frequency connector; 6. Radio-frequency terminal load; 7. Signal demodulation and analysis device; 11. slide rail or tab; 12. Signal transmission line.

DETAILED DESCRIPTION

The technical solution(s) of the present invention will be clearly and completely described below in conjunction with the accompanying drawings. Obviously, the described embodiment(s) are only some of the embodiments of the present invention, rather than all of them. Based on the disclosed embodiments of the present invention, all other embodiments obtained by those skilled in the art without making creative efforts fall within the scope of protection.

Figure 2:
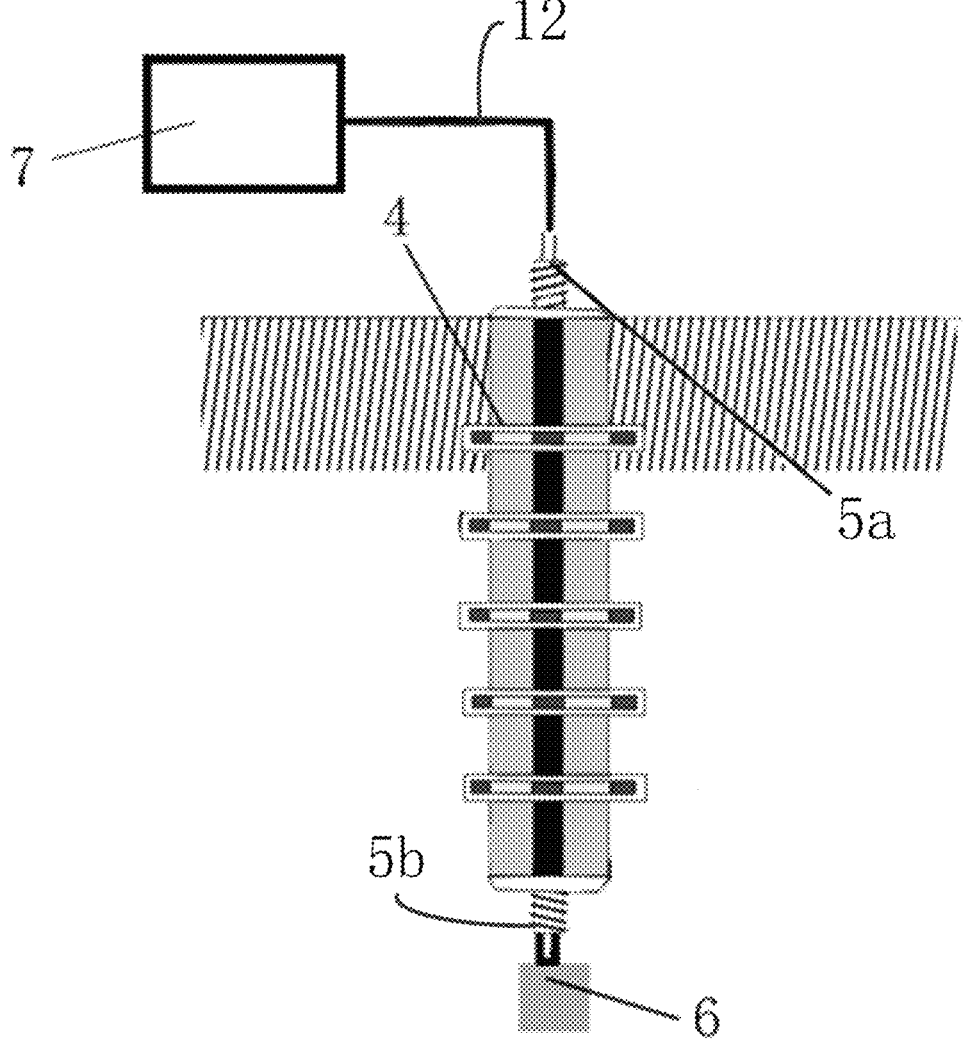
FIG. 2 is a diagram showing the exemplary coaxial waveguide-based geotechnical multi-point deformation sensor buried in the soil.
Figure 3:
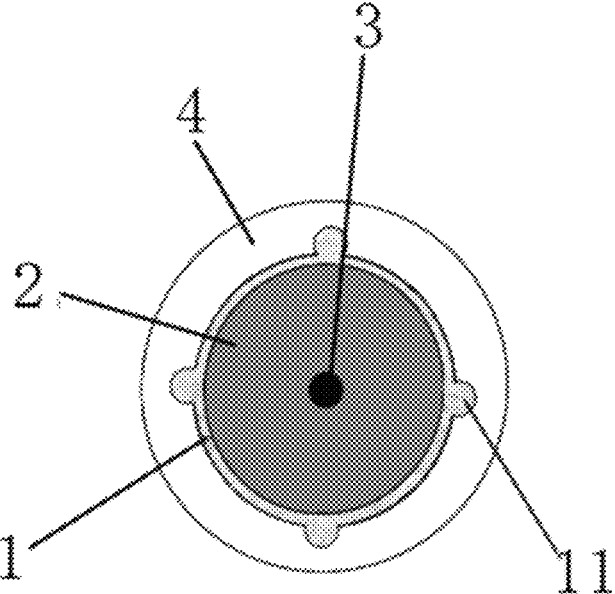
FIG. 3 is a cross-sectional view of the exemplary coaxial waveguide-based geotechnical multi-point deformation sensor.

FIG. 1 is a diagram showing an exemplary coaxial waveguide-based geotechnical multi-point deformation sensor. FIG. 2 is a diagram showing the exemplary coaxial waveguide-based geotechnical multi-point deformation sensor in the soil. FIG. 3 is a cross-sectional view of the exemplary coaxial waveguide-based geotechnical multi-point deformation sensor.

The exemplary coaxial waveguide-based geotechnical multi-point deformation sensor, as shown in FIGS. 1 to 3, comprises an outer conductor 1, magnetic metal support frames 2, an inner conductor 3, and annular magnets 4. The outer conductor 1 is open at both ends and hollow inside (e.g., cylindrical). The number of said magnetic metal support frames 2 is multiple (e.g., n or more, where n is an integer of 3 or more, such as 4, 5, 6, etc.), and they are arranged inside said outer conductor 1. Each of said magnetic metal support frames 2 is sequentially spaced along the axial direction of said outer conductor 1, and each of said magnetic metal support frames 2 includes a through-hole. The through-hole may be in the center of the magnetic metal support frame 2, and the magnetic metal support frame 2 may further include a gasket between it and the through-hole. The gasket may have a lubricant along its inner circumferential surface, or comprise a self-lubricating material, to enable it to slide along the inner conductor 3.

The inner conductor 3 is inside said outer conductor 1 and extends from one end to the opposite end of said outer conductor 1 (e.g., of the cylinder). The inner conductor 3 passes through the through-hole of each magnetic metal support frame 2 and may be in contact with an inner surface or sidewall of each magnetic metal support frame 2. The number of said annular magnets 4 is also multiple, and may match or be equal to the number of (e.g., be in a 1:1 relationship with) the magnetic metal support frames 2. Each of said annular magnets 4 surrounds or circumscribes the outer conductor 1 and can move along said outer conductor 1. When said annular magnets 4 move, the moving annular magnet can drive the nearest said magnetic metal support frame 2, which follows the movement of the moving annular magnet 4. The inner conductor 3 and the outer conductor 1 have a central axis that is coincident with the central axes of the through-holes. The central axis of each through-hole is collinear with the central axes of the other through-holes.

In this embodiment, the outermost circumferential surface of each magnetic metal support frame 2 is in contact with the inner wall of the outer conductor 1.

The coaxial waveguide-based geotechnical multi-point deformation sensor is equipped with multiple magnetic metal support frames 2, arranged inside the outer conductor and spaced axially along the outer conductor 1. Each magnetic metal support frame 2 acts as a reflection point in the sensor. By reconstructing the interference spectra of two reflection points, a gauge-length can exist or be created between the two corresponding magnetic metal support frames 2. By collecting the changes in the interference spectrum signals of different gauge-lengths, the deformation of the geotechnical layer corresponding to the location of the gauge-length can be calculated, thus allowing the deformation of any geotechnical layer to be obtained, without requiring separate sensors for each geotechnical layer. Additionally, by adjusting the positions of the magnetic metal support frames 2, it is possible to monitor the deformation of geotechnical layers at different depths.

In this embodiment, the coaxial waveguide-based geotechnical multi-point deformation sensor may further comprise a first radio-frequency coaxial connector 5a that is mounted at or connected to one open end of the outer conductor 1. However, other types of radio-frequency connectors may also be suitable for the first radio-frequency connector 5a. One end of the inner conductor 3 may contact the first radio-frequency coaxial connector 5a.

In this embodiment, the coaxial waveguide-based geotechnical multi-point deformation sensor may further comprise a second radio-frequency coaxial connector 5b and a radio-frequency terminal load 6, wherein the second radio-frequency coaxial connector 5b is mounted at or connected to the other open end of the outer conductor 1. However, other types of radio-frequency connectors may also be suitable for the second radio-frequency connector 5b. The other end of the inner conductor 3 may contact the second radio-frequency coaxial connector 5b.

The radio-frequency terminal load 6 is connected to the second radio-frequency coaxial connector 5b.

In this embodiment, the coaxial waveguide-based geotechnical multi-point deformation sensor may further comprise a signal demodulation and analysis device 7, which may be connected to the first radio-frequency coaxial connector 5 via a coaxial signal transmission line 12. Other types of signal transmission lines 12 may also be suitable.

In this embodiment, each annular magnet 4 may be provided with one or more grooves, cut-outs or depressions (hereinafter, "grooves") in its inner wall. For example, each annular magnet 4 may have 2 or more (e.g., 3 or more, 4 or more, etc.) grooves in its circumferential inner sidewall, and when the annular magnet 4 has 2 or more such grooves or depressions, they may be equally spaced radially around the central axis of the annular magnet 4. The grooves may have any of a variety of shapes in a top-down view, such as concave (e.g., hemispherical), triangular, square, rectangular, etc.

The outer surface of said outer conductor 1 may include at least one slide rail or tab 11 extending axially from said outer conductor 1, and the slide rail or tab 11 and the groove of the annular magnet 4 are in contact with each other. The slide rails or tabs 11 may be in a 1:1 relationship with the grooves, and in some embodiments, the slide rails or tabs 11 can mate with the grooves. The slide rails or tabs 11 may have any of a variety of shapes in a top-down or cross-sectional view, such as convex (e.g., hemispherical), triangular, square, rectangular, etc. The slide rails or tabs 11 may thus have a shape that is complementary to that of the grooves.

In the embodiment shown in FIGS. 1-3, there are four convex slide rails 11 on the outer conductor 1 (e.g., for each annular magnet 4), and the convex slide rails 11 are evenly distributed along the circumference of (e.g., radially around) the outer conductor 1. In other embodiments, there are m slide rails 11 that extend along the surface of the outer conductor (where m is an integer of 2 or more) and that have a length sufficient for the grooves of each of the annular magnets 4 to fit onto or mate with the slide rails 11 (i.e., all of the annular magnets 4 can move along one set of slide rails 11).

Specifically, each open end of the outer conductor 1 may have a short engraved section, containing an internal thread (e.g., a screw fitting). One open end of the outer conductor 1 is connected to the first radio-frequency connector 5a via the threaded fitting (e.g., the first radio-frequency connector 5 includes a matching or mating threaded fitting on its outermost surface), and the opposite open end is similarly connected to the second radio-frequency connector 5b. The inner conductor 3 is inserted into at least one inner (e.g., pass-through) hole of the first and second radio-frequency connectors 5a and 5b, and preferably, opposite ends of the inner conductor 3 are in the pass-through hole in each of the first and second radio-frequency connectors 5a and 5b when the inner conductor 3 is in place in the sensor. The radio-frequency terminal load 6 may be screwed onto the second radio-frequency connector (e.g., using a threaded, screw-type fitting).

In this embodiment, the outer conductor 1 contains an insulator therein. The insulator effectively electrically insulates the inner and outer conductors 3 and 1 from each other. In one embodiment, the insulator is air.

In this embodiment, the center of each annular magnet 4 coincides with the center of the corresponding magnetic metal support frame 2 (e.g., the support frame 2 that the annular magnet 4 can drive).

As shown in the embodiment in FIGS. 1-3, the thickness of the annular magnet 4 may be essentially the same as that of the magnetic metal support frame 2, and the annular magnet 4 may be coaxial with the metal support frame 2.

In this embodiment, both the outer conductor 1 and the inner conductor 3 comprise a non-magnetic metal. The non-magnetic metal of the outer conductor 1 may be the same as or different from that of the inner conductor 3.

In this embodiment, the inner conductor 3 comprises a copper wire, and the outer conductor 1 comprises a copper tube or cylinder, with air as the insulator in the outer conductor 1 to form the coaxial waveguide device. Magnetic metal support frames 2 are placed inside the coaxial waveguide device. The magnetic metal support frames 2 are slidable, and may comprise double-cone-shaped iron support frames (see, e.g., the cross-sections of the support frames 2 in FIG. 4) that acts as reflection points. Corresponding to each reflection point or support frame 2, an annular magnet 4 is on the outside of the outer conductor 1 of the coaxial waveguide device. These annular magnets 4 can move along pre-fabricated slide rails 11 on the coaxial waveguide device, thereby forming a coaxial waveguide-based geotechnical multi-point deformation sensor. In some embodiments, the slide rails 11 may run along the length of the outer conductor 1, parallel with the central axis of the outer conductor 1.

Specifically, the reflection points are created based on the principle of forming a short circuit by connecting the inner and outer conductors 3 and 1. The material of the annular magnets 4 may comprise a magnetic metal, such as iron (which may be coated or treated with a corrosion-resistance material or agent), cobalt or nickel, or a magnetic alloy thereof with one or more metals and/or metalloids such as neodymium, chromium, molybdenum, manganese, niobium, aluminum, boron, carbon and silicon. In one example, the annular magnets 4 comprise a magnetic neodymium-iron-boron alloy (e.g., having the formula $Nd_2Fe_{14}B$).

In one or more embodiments, the working mechanism of the coaxial waveguide-based geotechnical multi-point deformation sensor is understood to be the following. Electromagnetic (EM) waves propagate forward along the coaxial waveguide device, with magnetic metal support frames 2 reflecting a portion of the EM waves, thus acting as reflection points. When EM waves reflected by any two reflection points intersect, an interference spectrum is formed. A change in the distance between two reflection points causes a frequency shift in the interference spectrum. The frequency shift of the interference spectrum is linearly related to the change in distance between the two reflection points, and the deformation between the two reflection points can be calculated from the frequency shift.

A method of adjustable gauge-length measurement using the coaxial waveguide multipoint deformation sensor may comprise continuously acquiring interference spectra between two of said magnetic metal support frames 2 during a preset time period, the two magnetic metal support frames 2 having locations corresponding to geotechnical layers; and obtaining information relating to the deformation of the geotechnical layers based on the acquired interference spectra.

Figure 4:
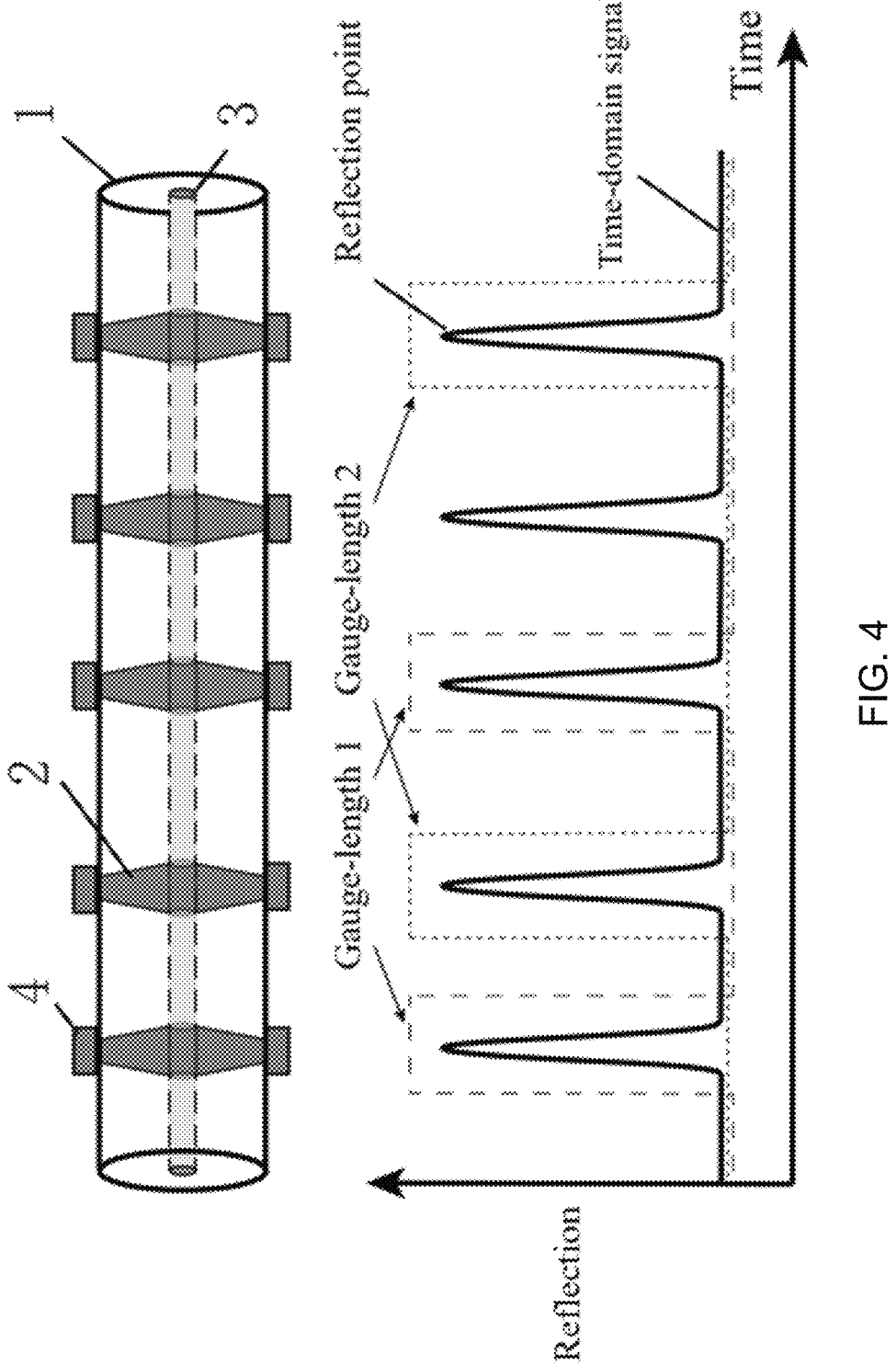
FIG. 4 is a view of an exemplary deformation sensor (top) and time-domain signals (bottom) showing a working principle of the present measurement method.

As shown in FIG. 4, the present measurement method is based on the principle that any two reflection points in the coaxial waveguide-based geotechnical multi-point deformation sensor can form a sensing gauge-length. By constructing a time-domain gating function to select the time-domain signals of any two reflection points of the sensor, and then performing time-frequency transformation on the time-domain signals to reconstruct the interference spectrum of these two reflection points. Thus, the deformation corresponding to the respective gauge-length can be calculated. If multiple pairs of reflection points are formed in various combinations, deformation measurement of the gauge-lengths at different scales can be achieved.

One specific implementation process is as follows: 1) The signal demodulation and analysis device emits EM waves into the coaxial waveguide-based geotechnical multi-point deformation sensor and collects the sensor's time-domain response signals. At this time, multiple reflection peaks can be observed in the time-domain signals, corresponding to the positions of each reflection point (magnetic metal support frame 2) in the sensor (as shown in FIG. 4). 2) A time-domain gating function is constructed based on the time-domain information of two selected reflection points. The time-domain gating function can filter or isolate unwanted signals, leaving only the signals of interest. The two reflection peaks filtered by the time-domain gating function form the time-domain signal of a gauge-length. 3) After performing a time-frequency transformation on the time-domain signal of the gauge-length, the frequency-domain interference spectrum of the gauge-length is obtained. The deformation of the gauge-length can be calculated from the frequency shift of the interference spectrum. 4) Based on measurement requirements and the deformation evolution process of the geotechnical layers, a gauge-length matching the thickness of the measured geotechnical layer can be flexibly selected. Repeating steps 1-3 enables precise measurement of the deformation of various geotechnical layers.

It should be noted that the above embodiments are only used to illustrate the technical solutions of the present invention, rather than limiting them. Although the present invention has been described in detail with reference to the above embodiments, it should be understood by those skilled in the art that modifications can be made to the technical solutions described in the above embodiments, or some or all of the technical features can be equivalently replaced, and such modifications or replacements do not depart from the scope of the technical solutions of the embodiments of the present invention.

What is claimed is:

1. A coaxial waveguide-based geotechnical multi-point deformation sensor, comprising:

an outer conductor that is open at opposite ends and hollow inside;

magnetic metal support frames inside said outer conductor and sequentially spaced along an axial direction of said outer conductor, wherein each of said magnetic metal support frames includes a through-hole;

an inner conductor inside said outer conductor and extending from one of the opposite ends to the other one of the opposite ends of said outer conductor, wherein said inner conductor passes through said through-hole of each of said magnetic metal support frames; and annular magnets, wherein each of said annular magnets surrounds said outer conductor and is configured to move along said outer conductor to drive a nearest one of said magnetic metal support frames;

wherein said inner conductor has a first central axis, said outer conductor has a second central axis coincident with the first central axis, and each of said through-holes has a third central axis coincident with the first and second central axes.

2. The coaxial waveguide-based geotechnical multi-point deformation sensor of claim 1, further comprising:

a first radio-frequency connector at one of the opposite ends of said outer conductor, and said inner conductor has a first end that contacts said first radio-frequency coaxial connector.

3. The coaxial waveguide-based geotechnical multi-point deformation sensor of claim 2, further comprising:

a second radio-frequency connector at the other one of the opposite ends of said outer conductor, and said inner conductor has a second end that contacts the second radio-frequency coaxial connector; and a radio-frequency terminal load connected to said second radio-frequency connector.

4. The coaxial waveguide-based geotechnical multi-point deformation sensor of claim 3, further comprising:

a signal demodulation and analysis device; and a signal transmission line connecting the signal demodulation and analysis device to said first radio-frequency connector.

5. The coaxial waveguide-based geotechnical multi-point deformation sensor of claim 4, wherein each of said annular magnets includes an inner wall with one or more grooves, cut-outs or depressions therein, said outer conductor has an outer surface with at least one slide rail or tab in contact with a corresponding one of the grooves, cut-outs or depressions.

6. The coaxial waveguide-based geotechnical multi-point deformation sensor of claim 5, wherein said outer conductor includes an insulator therein.

7. The coaxial waveguide-based geotechnical multi-point deformation sensor of claim 6, wherein each of said annular magnets has a center that coincides with a center of a corresponding one of said magnetic metal support frames.

8. The coaxial waveguide-based geotechnical multi-point deformation sensor of claim 7, wherein said outer conductor and said inner conductor comprise a same or different non-magnetic metal.

9. The coaxial waveguide-based geotechnical multi-point deformation sensor of claim 1, wherein the nearest one of said magnetic metal support frames follows movement of a corresponding one of said annular magnets when the corresponding one of said annular magnets moves.

10. The coaxial waveguide-based geotechnical multi-point deformation sensor of claim 5, wherein each of the slide rails or tabs is convex.

11. The coaxial waveguide-based geotechnical multi-point deformation sensor of claim 5, wherein each of the slide rails or tabs extends radially from said outer conductor.

12. The coaxial waveguide-based geotechnical multi-point deformation sensor of claim 5, wherein each of the slide rails or tabs mates with the corresponding one of said grooves, cut-outs or depressions.

13. The coaxial waveguide-based geotechnical multi-point deformation sensor of claim 1, comprising at least three magnetic metal support frames and at least three corresponding annular magnets.

14. The coaxial waveguide-based geotechnical multi-point deformation sensor of claim 1, the magnetic metal support frames and the corresponding annular magnets are present in a 1:1 relationship.

15. The coaxial waveguide-based geotechnical multi-point deformation sensor of claim 2, wherein the first radio-frequency connector is a first radio-frequency coaxial connector.

16. The coaxial waveguide-based geotechnical multi-point deformation sensor of claim 3, wherein the second radio-frequency connector is a second radio-frequency coaxial connector.

17. A method of adjustable gauge-length measurement using the coaxial waveguide multipoint deformation sensor of claim 1, comprising:

continuously acquiring interference spectra between two of said magnetic metal support frames during a preset time period, the two magnetic metal support frames having locations corresponding to geotechnical layers; and obtaining information relating to deformation of the geotechnical layers based on the acquired interference spectra.

* * * * *